United States Patent [19]
Selin et al.

[11] Patent Number: 5,903,849
[45] Date of Patent: May 11, 1999

[54] ADAPTER FOR DATA TRANSMISSION TO AND FROM A RADIO TELEPHONE

[75] Inventors: Markku Selin, Tampere; Jukka Ranta, Salo; Kari Oinonen, Kangasala, all of Finland

[73] Assignee: Nokia Mobile Phones Ltd., Salo, Finland

[21] Appl. No.: 08/807,285

[22] Filed: Feb. 27, 1997

Related U.S. Application Data

[63] Continuation of application No. 08/345,624, Nov. 28, 1994.

[30] Foreign Application Priority Data

Nov. 30, 1993 [FI] Finland .................................. 935347

[51] Int. Cl.⁶ .................................................. H04M 11/00
[52] U.S. Cl. .......................................................... 455/557
[58] Field of Search ..................... 455/418, 420, 455/426, 466, 556, 557, 558

[56] References Cited

U.S. PATENT DOCUMENTS

| | | | |
|---|---|---|---|
| 4,369,516 | 1/1983 | Byrns | 375/359 |
| 4,390,963 | 6/1983 | Puhl | 395/309 |
| 4,486,624 | 12/1984 | Puhl | 370/24 |
| 4,697,281 | 9/1987 | O'Sullivan | 379/59 |
| 4,972,457 | 11/1990 | O'Sullivan | 379/59 |
| 5,127,041 | 6/1992 | O'Sullivan | 379/59 |
| 5,237,570 | 8/1993 | Smolinske et al. | 370/95.1 |
| 5,249,218 | 9/1993 | Sainton | 379/59 |
| 5,353,328 | 10/1994 | Jokimies | 379/58 |
| 5,483,576 | 1/1996 | Staples | 379/58 |
| 5,490,235 | 2/1996 | Von Holten et al. | 395/2.79 |
| 5,590,414 | 12/1996 | Marui et al. | 455/89 |
| 5,649,001 | 7/1997 | Thomas et al. | 379/3.07 |

FOREIGN PATENT DOCUMENTS

| | | |
|---|---|---|
| 90172 | 9/1993 | Finland . |
| WO 91 07044 | 5/1991 | WIPO . |
| WO 93 20643 | 10/1993 | WIPO . |

OTHER PUBLICATIONS

Newton, Harry; Newton's Telecom Dictionary; Flatiron Publishing; pp. 273, 357 and 821. Jan. 1994.

Finnish Office Action and English Translation thereof, dated Sep. 14 1994, Nokia Mobile Phones Ltd., Application No. 935347.

Ericsson Review, Nov. 3, 1987, pp. 130–140, "Cellular mobiltelefoni–Racal–Vodafone–natet i Storbritannien", Edward Beddoes, Mike Pinches.

*Primary Examiner*—David R. Hudspeth
*Assistant Examiner*—M. David Sofocleous
*Attorney, Agent, or Firm*—Perman & Green, LLP

[57] ABSTRACT

A data terminal is able to use data services of a cellular network so that it is detachably connected to a mobile phone with a connection cable. The data services need not be supported by the telephone. The connection cable forms a fast synchronous serial bus. The service-specific data protocols needed in implementing a data service are accomplished in a microprocessor unit in an external interface adaptor connected to one end of the serial bus, said processor being via the bus directly connected to the processor performing the signalling and control functions and the channel coder of the phone. Thus, the interface adaptor is able to exchange messages directly with the processor unit and the channel coder of the phone.

16 Claims, 5 Drawing Sheets

ADAPTER FOR DATA TRANSMISSION TO AND FROM A RADIO TELEPHONE

This is a continuation of copending application Ser. No. 08/345,624 filed on Nov. 28, 1994.

BACKGROUND OF THE INVENTION

The present invention relates to a procedure and an apparatus, relating to the connection between a data terminal means and a radio telephone.

The modern digital cellular systems offer the user a great number of services in addition to standard call transmission. For instance, in the Global Systems for Mobile phones (GSM) system the services have been classified into three classes: telecommunications, bearer and auxiliary services.

The telecommunications services are services which are available to the network subscriber. They enable data transfer between the users according to agreed communications practices, i.e. protocols. In addition to transmission of telephone calls, the GSM standard includes the following telecommunications services: emergency call, automatic fax group 3, and short message service.

The bearer services make the use of the telecommunications services possible. They are divided into the following classes: circuit switched asynchronic data transfer, circuit switched synchronic data transfer, Packet Assembly Disassembly (PAD) communication as asynchronic data transfer, packet switched data, and exchangeable speech/data transfer.

The services are defined to be transparent and non-transparent. A transparent service is not provided with flow control, and the error ratio thereof varies in accordance to the mode of the radio channel. A non-transparent service includes a flow control and a specific Radio Link Protocol RLP, provided with an Automatic Repeat request ARQ, whereby the delays vary but the error ratio is low.

When data services specified in digital cellular systems are used, they and the transfer protocols associated therewith require a considerable amount of processing capacity, as well as program and data memory capacity of the mobile phone, because a data terminal connected to the phone, such as a facsimile device or a personal computer, uses data transfer protocols of its own, which in the phone have to be adapted to the protocols of the cellular system to be used.

PCT Application WO 93/02512 describes a common radio telephone part comprising a transceiver, a speech coder, a microprocessor unit with a memory, and a data arrangement block. A plurality of peripherals can be connected to the common part via a data bus. The bus is a cable in which time division multiplexed data transfer on a data bus is carried out between the part in common and the peripherals. Each peripheral part also includes a data arrangement block which formats the digital data produced by the part and positions it in an appropriate time interval of the bus. In the application aspects associated with bus management are described in detail, such as priority and control of collisions. There is no discussion of the respective functions of the common and peripheral parts. The peripheral part refers primarily to separate operating means (handset + keyboard + speech codec). A plurality of calls travel via one transceiver.

In WO 93/02512 a modern phone is described as including functions supporting data transmission, such as a radio unit, the rf frequencies thereof being those used in said system, and an interface between the radio unit and the other functions; a system-specific signalling towards the network and from the network to the phone (such as call control) and other control functions, such as user connection; and a system-specific coding/decoding and potentially error correction of the data travelling via the radio interface to the traffic channel and therefrom.

SUMMARY OF THE INVENTION

In accordance with a first aspect of the present invention there is provided an adapter for coupling a radio telephone and a data terminal comprising:

a translator for translating signals conforming to a first protocol into signals conforming to a second protocol;

a first coupling member for detachably coupling the translator to one of a radio telephone and data terminal; and a second coupling member for detachably coupling the translator to the other of the radio telephone and data terminal.

The invention provides apparatus that divides the means for utilizing a radio telephone network data service advantageously between a radio telephone and a connection member by providing the means for adapting signals to a desired protocol in a unit separate from the radio telephone itself.

Space available within the phone is not further restricted by extra space occupying components. The cost of the radio telephone itself is not increased which is advantageous as not all telephone users need data services. For those users, a radio telephone that does not support data services adequate.

The present invention discloses a procedure of how to divide the processing functions between the mobile phone and one data terminal apparatus to be connected thereto. A rapid external serial bus may be implemented in the form of a physical cable, with an external adaptor connected thereto to provide the first coupling member. The adaptor may be physically connected to the end of the cable facing the data terminal and it communicates with the mobile phone, exchanging data directly both with the microprocessor unit of the phone which carries out the signalling functions and with the channel coder of the phone. The adaptor converts the data protocol of signals originating from the mobile phone into the protocol used by the terminal means, and vice versa, whereby messages such as fax messages originating and being received by the terminal means can be communicated. The data travelling on the cable is in a form appropriate for the input/output format of the signal processor of the codec of the phone and of the microprocessor. Care is taken of the general control, so that the bus is very rapid. The data terminal can, amongst other things, be a PC or a facsimile device.

The serial bus may be a synchronous data bus adapted to transmit data in response to clock signals. The clock signals may be provided by a radio telephone.

By controlling signal transmission with a clock, power can be saved by removing the clock signal during inoperative periods. The generation of clock signals may be inhibited by the translator, the radio telephone and/or the data terminal. In one embodiment no clock signal is transmitted to the bus if no information is transmitted from the data terminal via the phone to the network or no information is arriving from the network to the data terminal.

Signalling and control messages transmitted may be error corrected, whereas no error correction may be necessary for traffic channel data.

The data rate on the bus is preferably 50 to 150 kbits/s. The serial bus is preferably an active cable in which all signals carried from the phone to the bus are buffered. Means is preferably provided for providing an operating voltage from the translator to the buffer. Messages exchanged along the bus preferably include a target address indicating the address of the device or the program part of the device or of the layer, and a data field transferred transparently via the bus.

The second coupling member may comprise an RS232 and/or PC-bus coupling interface. The translator may further comprise a means for translating signals conforming to a third protocol to one or both of the first and second protocols which is preferably an Autocaller Module.

In accordance with a second aspect of the invention there is provided a method for utilizing data services provided by a cellular network comprising:

coupling a radio telephone and a data terminal using an adapter having a translator for translating signals conforming to a first protocol into signals conforming to a second protocol and vice versa; a first coupling member for detachably coupling the translator to the radio telephone; and a second coupling member for detachably coupling the translator to the data terminal;

transmitting signals from one of the radio telephone and data terminal in one of the first and second protocols;

translating the signals transmitted from the one of the first and second protocols to the other of the first and second protocols; and transmitting and/or receiving signals for transfer to/and or from the data terminal via the radio telephone and a cellular network.

The radio telephone itself provides the functions described in WO 93/02512 as being available in a modern phone, rather than adding features to the phone to support data transmission, the following preferred features are put in the adaptor:

1) RS232 or PC bus interface that offers a standard asynchronic interface from the adaptor to the PC either via a serial link or via an internal parallel bus of the PC.

2) An automatic call module offers a standardized command interface to a terminal apparatus (e.g. EIA/TIA-602 Data Transmission system and Equipment-Serial Asynchronous Automatic Dialling and control (basic AT control from e.g. PC) command standard) or CCITT V.25bis a standard set of commands to manage a data call from a DTE (Data Transmission Equipment) (e.g. a PC). This allows access to the data services of the cellular network through the use of existing, commercially available programs. An Autocaller Module interprets the AT (commands received from a DTE) and V.24bis commands specified for the modem, and being available e.g. for making a call from a PC program, in other words, the PC controls the data card with the aid of said commands. The AT commands are well known control commands of the modem in the art, as are the V.25bis commands, which are specified by CCITT and are more limited than the AT commands.

3) A system-specific data service module provides protocols which via a serial bus utilize directly the coder/decoder interface of the radio unit. The protocols have been positioned in the adaptor and they comprise protocols required in the bearer services, such as data link level protocols, the adaption of the transfer rate of the user to the transfer rate of the traffic channel, etc. Within the adaptor, also a facsimile protocol can be inserted so that the adaptor may offer a PC-fax interface, such as EIA/TIA-578 (asynchronous Facsimile DCE Control Standard (fax class 1)) and EIA/TIA-592 (Asynchronous Facsimile DCE Control Standard (fax class 2)), conforming to the standard for a personal computer PC, whereby the adaptor performs a conversion from the PC-facsimile protocol to the facsimile protocol of the cellular system.

The data protocols required in using data services are thus performed and the interfaces visible in The data terminal apparatus are implemented by an external adaptor, not the mobile phone, which enables implementation of complicated protocols and data applications flexibly and without setting any higher requirements for the telephone itself. Hereby, the telephone apparatus acquired by the user is cheaper as compared with a telephone provided with all data service features, and the user is still able to use the data services available through the adaptors in accordance with the present invention.

The bus preferably meets at least the following requirements:

(i) it should be sufficiently fast to transfer the traffic channel data, (ii) physically, the bus should be of standard type in such a way that the serial ports of the commercially available signal processors and the general purpose microprocessors are bus compatible, (iii) the signalling and errorless transfer of control messages should be assured in all situations because a call may otherwise come to a dead end, (iv) for data transfer on the traffic channel no time for a retransmission is available.

For instance, in a GSM system, the bit rate on a full-speed speech channel is 13 kbit/s and on a full-speed data channel, 12 kbit/s. For the sake of the processing required and for minimizing the bus delay, a bus in accordance with the invention should reach 50 kbit/s bit rate, so, the bus should be synchronized because of the high bit rate. The clock signal needed in synchronization is generated by the phone, which renders the most appropriate transfer rate possible, simultaneously minimizing the interference problems. The clock signal of the bus is switched off when there is nothing to transmit, so as not to consume the power of the radio telephone in vain. A standard-type physical bus can be implemented by using a bus designed to be connected to speech codecs since the majority of signal processors DSP support a bus like that. Signalling and errorless transfer of control messages can be implemented using an appropriate error detection together with message acknowledgement and retransmission. On a traffic channel random erroneous data blocks will cause no greater harm since errors occur normally also on a radio channel, and moreover, on a typical local bus suitable for use in accordance with the present invention errors are unlikely.

BRIEF DESCRIPTION OF THE DRAWINGS

Embodiments of the invention will now be described in detail with the aid of the following schematic figures, of which.

DETAILED DESCRIPTION OF THE INVENTION

Figure 1A:
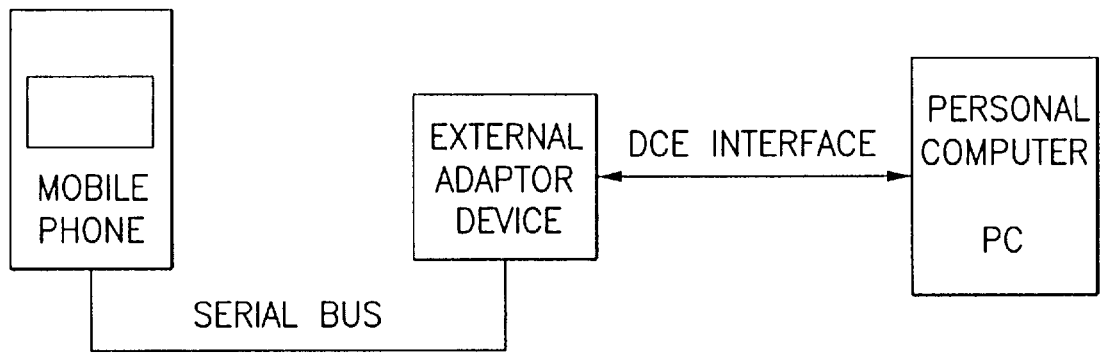
FIGS. 1A, 1B and 1C present the operating environment of the invention.
Figure 1B:
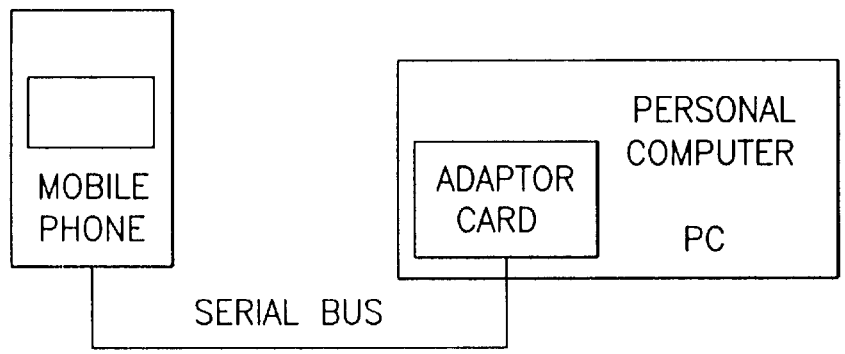
Figure 1C:
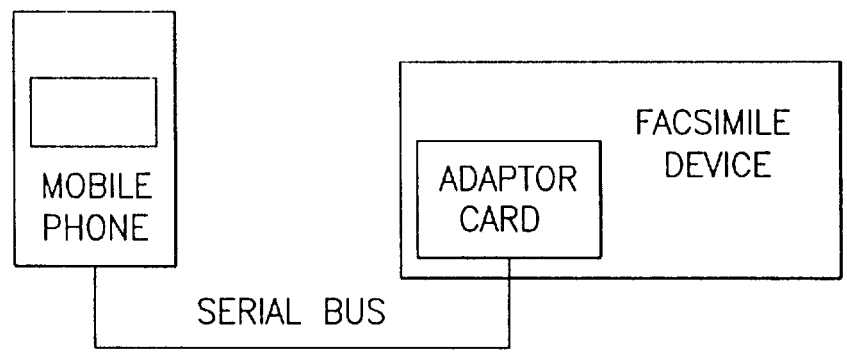

FIGS. 1A, 1B present various embodiments of the invention. In FIG. 1A, a radio telephone is connected via a serial bus in accordance with the invention to an external adaptor provided as a separate means and adapting the data passing via the DCE interface from a Personal Computer (PC) to the serial bus and to the protocol used by the bearer service. In FIG. 1B the adaptor is a card connected to the PC, e.g. to a free card location, whereby the adaptor is directly connected to the internal data bus of the PC. In a third embodiment of FIG. 1C, a facsimile device has been connected to a phone with the aid of an adaption card and a serial bus cable. Now, the adaptation card replaces a conventional analog modem. In all cases, the interface adaptor has been connected via a serial bus to the mobile phone. All signalling, control and traffic data pass via the bus. The messages are guided into the correct block within the radio telephone according to the address associated with the message. Typically, in a radio telephone the signalling protocols are processed by a general-purpose microprocessor and the channel coding/decoding is carried out by a signal processor DSP.

Figure 2:
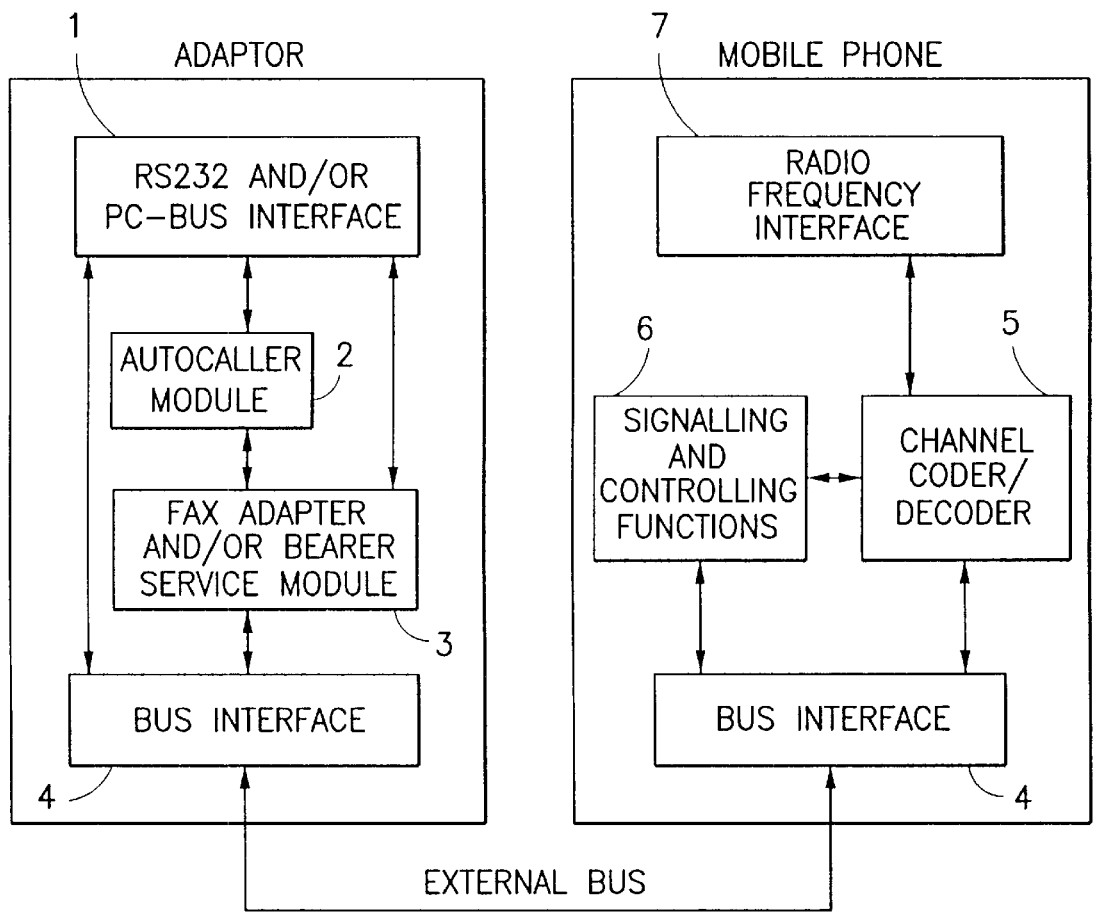
FIG. 2 illustrates the operating blocks of the adaptor unit connected to the serial bus and of the radio unit of the phone.

FIG. 2 presents the operating blocks of the adaptor unit connected with the serial bus and of the radio unit of the mobile phone, in which also the division of work between the units can be seen. Block 1 in the adaptor comprises a standard interface through which connection to a fax device or a PC is made. The interface of the interface block 1 is RS232 interface, whereby the adaptor can be connected to the asynchronous COM port of a PC, or it can be an interface conforming to a PC bus, whereby the adaptor is directly connected to the internal data bus of the PC. Block 2 of the adaptor is an automatic paging module which interprets the AT or V.25bis commands transmitted thereto by a PC, i.e. the commands of the modem. The data for facsimile transmission is conducted from the interface block 1 to a facsimile adaptor and bearer service module 3 that converts the outgoing data into data conforming to the protocol required by the bearer service used for that facility. Data in accordance with the desired protocol is conducted via the bus interface 4 to a fast serial bus.

Data travelling via the serial bus arrives at the bus interface block 4 located in the radio telephone, said block guiding the data in accordance with the address included therein either to block 6 for performing signalling and control operations, (in practice the microprocessor of the radio telephone) or to the channel coder of the phone which is a signal processor DSP. The data is now in such form in which it can be conducted directly to the I/O gate so that no conversions need be made. The channel coder in block 5 codes both the control data from block 6 and the traffic data from an external bus, such as a facsimile message, whereby the coded information is transmitted via the radio unit 7 to the radio path.

When the travelling direction of the data is from the radio path to the terminal, the procedure is completely understandable on the basis of what is presented above. The data received from the radio path is decoded in decoder 5 and conducted as decoded control data or traffic data as such to the bus interface block which adapts the data for the external bus. In the adaptor the functions are performed in reverse order compared with the above-described description concerning the data transmitted by the terminal.

Figure 3:
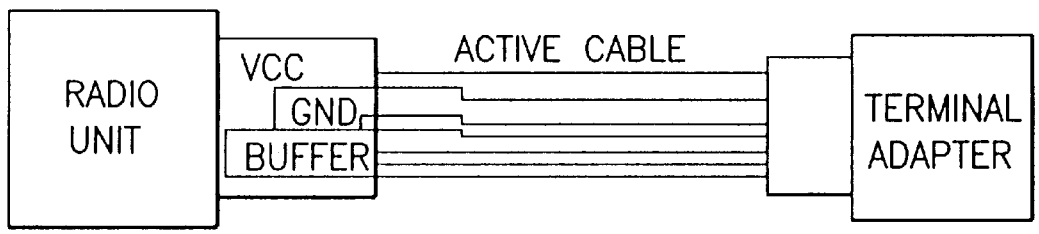
FIG. 3 is a schematic presentation of an active cable.

The physical channel between the adaptor and the phone is an active channel, presented schematically in FIG. 3. By using an active channel, the problems can be solved which would otherwise be produced when the adaptor or the phone is switched off or when power is connected to either of the means. Buffers are inserted in the connector of the cable facing the phone. Hereby, a line is needed to supply the operating voltage VCC from the adaptor to the buffers, and a connector in the adaptor where through the operating voltage is supplied to the cable. The operating voltage VCC of the active buffering of the cable is provided by the adaptor and all signals towards the adaptor have been buffered. When the power is switched off from the interface adaptor, the active buffer becomes passive, as a result whereof no electrical connection prevails between the phone and the adaptor. In this manner it is possible to prevent the interface adaptor from taking too much power from the radio unit of the phone which could be harmful for the radio unit. In addition, the buffering reduces the power consumption of the radio unit when the bus is used normally. This is very important particularly when the phone is a battery operated phone, the aim being then as low a power consumption as possible.

The active cable also reduces the detrimental phenomena caused by a long cable when the buffering is positioned as close to the apparatus to be protected as possible, in this case a phone. The buffering prevents the external interferences particularly when the cable is not connected to the data terminal and the free end of the cable lies in the vicinity of the source of interference. On the other hand, the buffering reduces interferences also when the phone makes attempts to transmit data when the interface adaptor is passive or the cable has been switched off at the other end. This is because a buffer in passive state will not let any signals through. The active cable also makes feasible the use of various operating voltages in the phone and in the interface adaptor because the conversion of the voltage levels can be performed in the cable.

One element of the present embodiment is an external serial bus connecting the adaptor and the phone, said bus being physically implemented using the active cable described above. The bus is used as described briefly above, to transmit signalling, control information and traffic channel information. The protocol of the bus is a two-level protocol, whereby an errorless transmission of a control and signalling message is assured, but as to the information transmitted on the traffic channel, error detection is thought to be enough without any correction thereof. The physical bus connection interface in the phone, FIG. 2, comprises five pins: (1) a pin for the data to be transmitted, (2) a pin for the data to be received, (3) a pin for transmitting clock pulses from the radio unit to the bus, (4) a pin for transmitting the synchronization pulses provided by the radio unit to the bus (each 8-bit byte passing via the bus is preceded by a synchronizing pulse), and (5), a grounding pin. The signals passing through the pins are at CMOS level and the bus has been buffered. The data rate is in the range of 50 to 150 kbit/s, whereby the maximum delay of a traffic channel frame is about 5 ms.

In practice, one possibility to implement the physical layer of the synchronous data bus is to utilize the Serial Input/Output (SIO) interface of the DSP16 processor family, produced by AT&T. The signal processor of the DSP16 family in the phone performs channel coding and decoding. The signalling protocols are processed by MC68302 by Motorola in the adaptor (block 3, FIG. 2), one of the serial communications controllers of which can be changed to operate transparently in the Pulse Code Modulation (PCM) highway mode operating almost entirely in the same way as the SIO interface of DSP. When the clock and synchronization signals required by the SIO interface are generated in the phone, an almost complete connection between said two processors can be implemented. Also a separate circuit can be used for generating said signals. In this way two microprocessors of different types can be connected without any compatibility problems so usual in practice.

Figure 4:
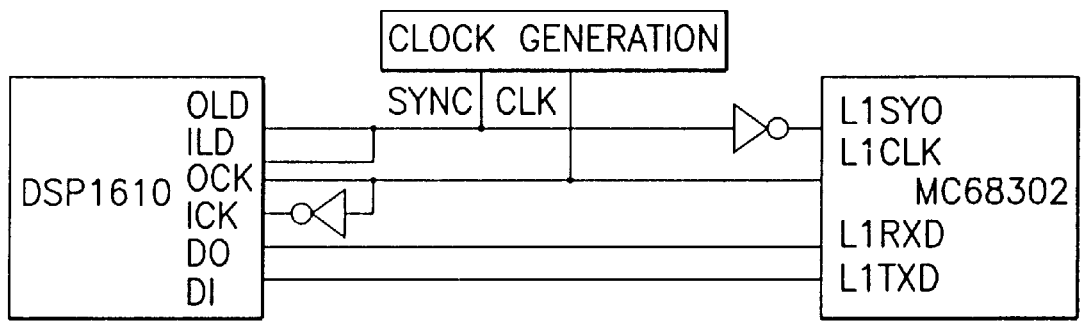
FIG. 4 presents a physical connection between a microprocessor and a signal processor.

FIG. 4 presents a physical connection between MC68302 microprocessor and DSP16 signal processor. The block on the left illustrates the signal processor of the phone which in the present example is Motorola DSP1610 but which could also be another suitable one. The block on the right illustrates a processor in a data adaptor, performing the adaption of the data to be transmitted to the protocol according to the service used, and respectively, conversion of the data according to the protocol of the received data into a form readable by the data terminal. It is noteworthy that the block generating the clock and synchronizing signals Clock Generation is located in the phone and that the signals are transmitted in conductors of their own via an external serial bus in accordance with the invention to a data adaptor at the other end of the bus. The labels of the signal connections in the signal processor are as follows:

OLD (Output Load). The descending edge of this signal starts transmission of a 8-bit data byte.

ILD (input Load). The descending edge of this signal starts reception of a 8-bit data byte.

OCK (Output Clock). A clock signal, at the pace at which data is transmitted.

ICK (Input Clock). A clock signal, at the pace at which data is received.

DO (Data Output). Data to be transmitted.

DI (Data Input). Data to be received.

Respectively, the labels of the interfaces of the microprocessor in the data adaptor are as follows:

L1SYO (Layer 1 Sync.) The ascending edge entering the interface starts transmission of a 8-bit data byte.

L1CLK (Layer 1 Clock). A clock signal, at the pace at which transmission and reception take place.

L1RXD (Layer 1 Received Data). The data to be received.

L1TXD (Layer 1 Transmitted Data). The data to be transmitted.

The synchronization of the L1SYO and ICK inputs and, respectively, the clock signals are inverted in inverters. As regards the timing, the synchronization and the clock signals are generated in the phone so that the descending edge of the synchronization signal is in the middle of the clock pulse when the pulse is up and the ascending edge of the synchronizing signal is in the middle of the clock pulse when the pulse is up or down.

The physical implementation of a serial bus is presented in the foregoing with an active cable as well as the generation of the clock and synchronization signals. The data transfer protocol used in the bus is described below, referring to FIGS. 5 and 6.

Figure 5:
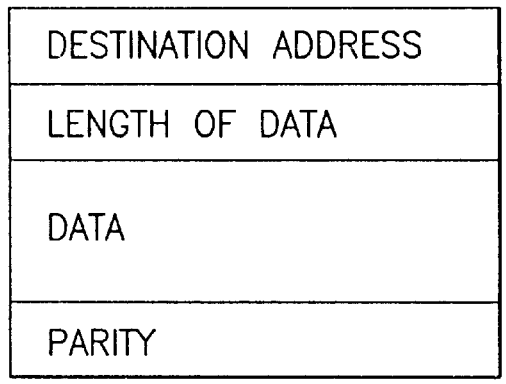
FIG. 5 presents a format of a message passing on the bus.

FIG. 5 presents a format of a message. The message is started with a target address, being a receiving block, a physical apparatus or a program task or a layer included therein. Therethrough it is made possible for a device connected to the phone via the serial cable to communicate directly with both the channel coder/decoder and the signalling and control block of the phone, and additionally with any block having an address of its own. The address must, of course, deviate from the synchronization byte. Subsequent to the address a notice on the length of the data message is given, followed by the data message itself. The format thereof can be any one compatible with the data service used and supported by a program layer corresponding to the service. The message is transferred transparently via the bus. At the end of the message there are the parity bits.

Figure 6:
FIG. 6 shows a part of the data flow passing on the bus.

FIG. 6 shows a part of the data flow passing in the bus, comprising messages according to FIG. 5 and synchronization bytes therebetween. Since the bus is synchronous, particular synchronization bytes must be added in the data flow when there is no data to be transmitted. The receiver is recognizing them without paying any attention thereto. As mentioned above, the synchronization byte must deviate from any address used so that the receiver is capable of making difference between the synchronization byte and the start of the message. The data message following after the address field is received transparently, i.e. no correlation with the synchronization byte is looked for before reception of the entire message.

The messages as those in FIG. 5 can be signalling and control messages. The data included therein is related to the paging control, short message service and various internal operation procedures in the phone. The errorless nature of the transmission of signalling and control messages is assured in such a way that when transmitting a message, the acknowledgement timer is started and that the messages have an ordinal number so that the receiving end detects a message transmitted twice. If the parity check of a received message verifies that the message is errorless, an acknowledgement is sent with the same ordinal number as in the message. If instead, the checking shows that the message is erroneous, it is rejected and no acknowledgement is sent. Hereby, after the time for the acknowledgement timer is over, the transmitting party transmits the message again, with the assumption that the maximum amount set for the repetition transmissions has not been exceeded. If exceeded, the data transmission is given up and the bus is assumed to be switched off from the phone.

The messages according to FIG. 5 may be also traffic channel messages. These are true information messages introduced to the channel coder to be transmitted further by the radio, or those received by the radio and decoded in the channel decoder. Differing from the control and signalling messages, the traffic channel messages are transmitted onwards even though the parity check shows that the message is erroneous. Depending on the service adopted, the receiver can either use or not use the erroneous information.

Figure 7:
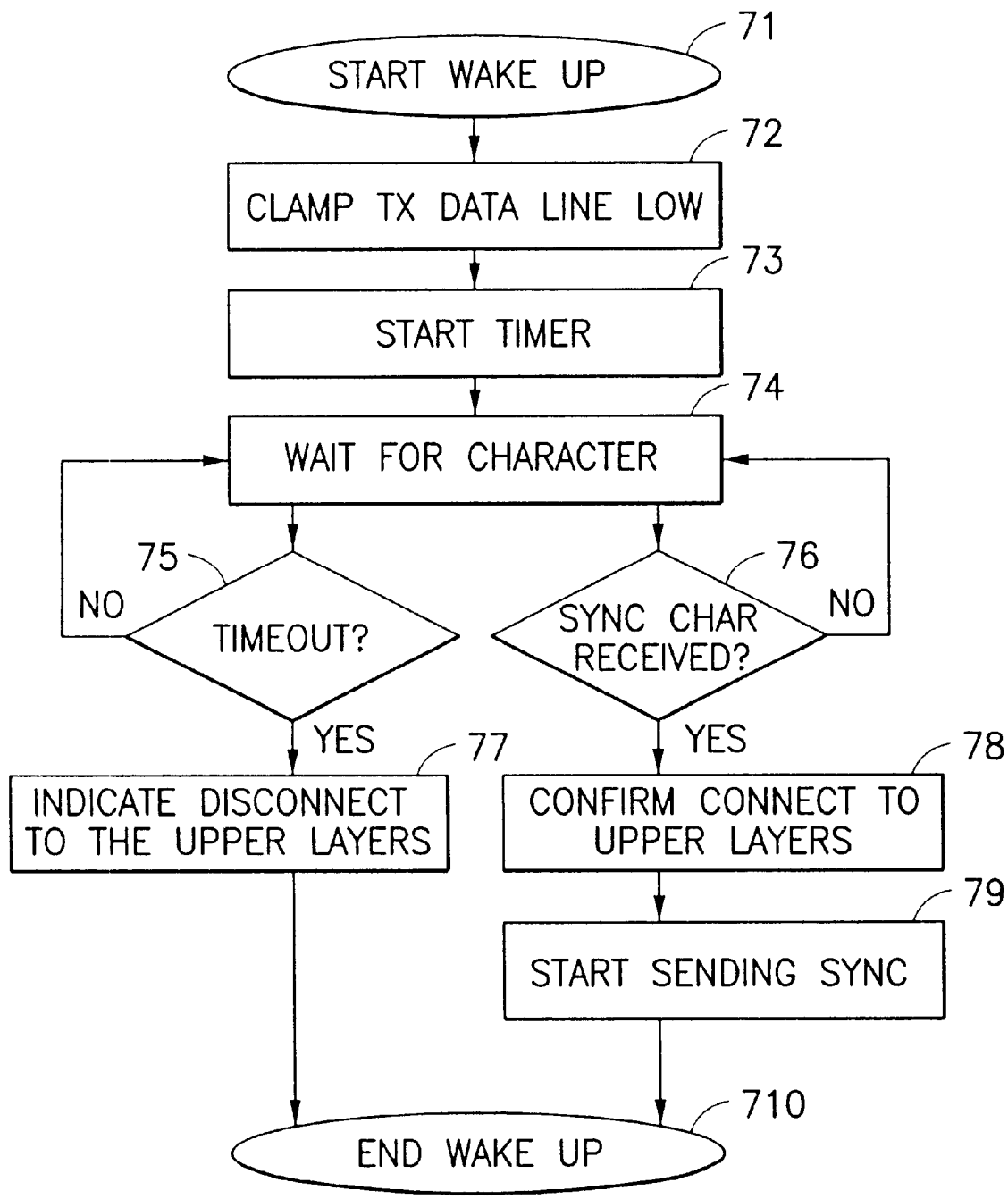
FIG. 7 illustrates activation of the bus.

Let us examine further the contribution of the clock signal in the present invention with the aid of FIG. 7. The figure is a flow chart from the beginning of the activation of the bus. As mentioned before, the clock signals of the bus are generated in the phone. First, the bus is, after switching on the operating voltage, in wake up state and there is no clock signal in the bus. Now, in block 72, the interface adaptor can request the phone to activate the bus by shifting the line of the data to be transmitted into the state 'low'. Said line is line L1TXD in the block on the right side in FIG. 4. The timer limiting the permitted time for synchronization is also started, block 73. The state 'low' of the line causes in the processor controlling the state of the bus in the phone an interruption, whereafter it starts the transmission of clock pulses to the bus and the synchronization process starts. In the course thereof the interface adaptor and the phone transmit merely synchronization bytes to the bus. The adaptor expects the arrival thereof in block 74. If none of them arrives within the time set for the timer, the failure is indicated in switching to the upper layers in block 75, and more attempts are given up. After receiving a byte in block 76 the synchronization is completed successfully and the connection to the upper layers of the protocol is confirmed.

The phone has also been enabled to activate a data bus when data addressed to a data terminal connected thereto is arriving. Now, the phone connects the clock signal to the bus. The interface adaptor is capable of receiving data at any time, so that the process continues as shown in FIG. 7.

Figure 8:
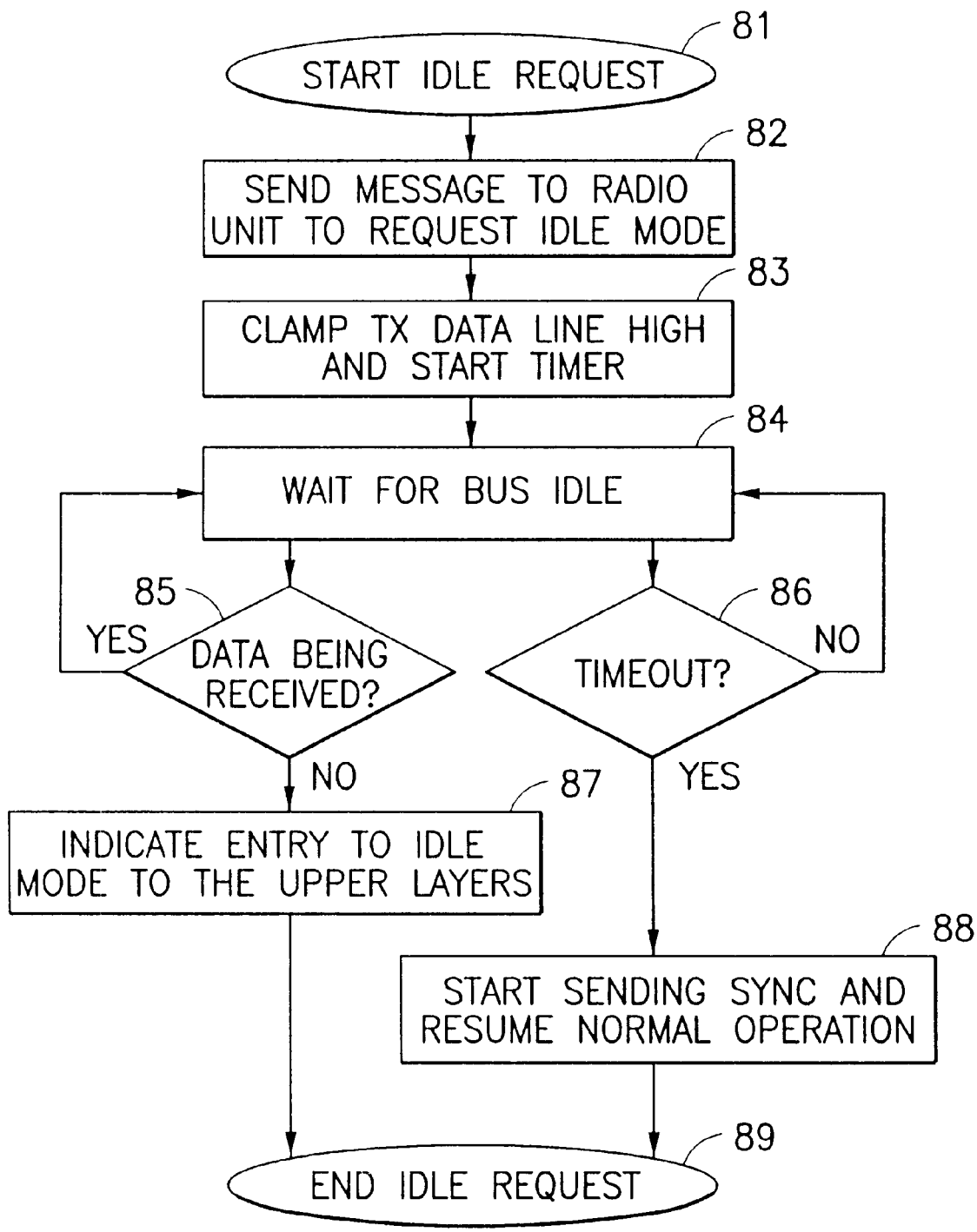
FIG. 8 illustrates entry of a bus into idle mode.

In order to save power, it is desirable to switch the clock signals off from the bus when in stand-by mode. This is shown in FIG. 8. The interface adaptor may send a request for an entry to idle mode by transmitting a specific control message of its own to the phone which the phone can accept or refuse to accept. If the phone accepts the request, it will no longer transmit clock pulses to the bus. The adaptor waits for the decision of the phone for a given time, in the course of which it shifts the data transmission line into the state 'high' not to make the activation request of the bus, which is the state 'low' of the bus.

The bus can be disconnected entirely from the phone when the cable is disconnected or it is damaged. In other words, from the point of view of the protocol, an error situation is in question. Disconnection of the bus is accomplished when there are neither clock pulses nor synchronization bytes, or when, within a given time, no messages have been observed, or when there is no confirmation of received signalling or control messages after retransmissions in the course of the time preset. The adaptor connects the data transmission line thereof into the state 'low'. It leads to a wake up disconnection of the bus in the processor of the phone when the cable is connected again. The phone disconnects the erection of the bus and a potential call is eliminated. When the cable is switched on, the traffic can start as described in conjunction with FIG. 7.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any further application derived therefrom.

In view of the foregoing description it will be evident to a person skilled in the art that various modifications may be made within the scope of the invention. In particular as taught by the invention, the bus and the adaptor may, while remaining within the protective scope of the accompanying claims, be implemented in a great number of different ways. With the bus and the adaptor a personal computer or a facsimile device can easily be connected to a digital mobile phone having no features supporting the data services of the network.

What is claimed is:

1. An adapter for coupling a radiotelephone and a data terminal comprising:

a translator for translating signals conforming to a first protocol into signals conforming to a second protocol;

a first coupling member for detachably coupling the translator to one of a radiotelephone and a data terminal; and a second coupling member for detachably coupling the translator to the other of the radiotelephone and the data terminal;

wherein the first coupling member comprises a data bus adapted for coupling with a radiotelephone; and the data bus is adapted to couple the translator with a central processor unit performing general control of the radiotelephone and a channel coder processor unit performing digital signal processing of the radiotelephone, and wherein the data transferred between the radiotelephone and the translator is processed digitally by the adapter in cooperation with the processor performing digital signal processing of the radiotelephone.

2. An adapter according to claim 1 wherein the data bus is a synchronous data bus.

3. An adapter according to claim 1 wherein the data bus is a serial data bus.

4. An adapter for coupling a radiotelephone and a data terminal comprising:

a translator for translating signals conforming to a first protocol into signals conforming to a second protocol;

a first coupling member for detachably coupling the translator to one of a radiotelephone and a data terminal; and a second coupling member for detachably coupling the translator to the other of the radiotelephone and the data terminal;

wherein the first coupling member comprises a data bus adapted for coupling with the radiotelephone;

the data bus is adapted to couple the translator with a central processor unit performing general control of the radiotelephone and a channel coder processor unit performing digital signal processing of the radiotelephone, and wherein the data transferred between the radiotelephone and the translator is processed digitally by the adapter in cooperation with the processor performing digital signal processing of the radiotelephone;

the data bus is a synchronous data bus; and the synchronous data bus is adapted to transmit data in response to clock signals provided by the radio telephone.

5. An adapter according to claim 2 wherein means is provided for interrupting data transmission along the synchronous data bus.

6. An adapter according to claim 5 wherein means is provided for initiating data transmission along the synchronous data bus.

7. An adapter according to claim 5 wherein the means for interrupting is responsive to the translator.

8. A method for utilizing data services provided by a cellular network comprising:

coupling a radiotelephone and a data terminal using an adapter having a translator for translating signals conforming to a first protocol into signals conforming to a second protocol and vice versa, there being a first coupling member for detachably coupling the translator to the radiotelephone, and a second coupling member for detachably coupling the translator to the data terminal;

a first step of transmitting signals from one of the radiotelephone and the data terminal in one of the first and the second protocols;

translating the signals transmitted from the one of the first and the second protocols to the other of the first and the second protocols; and transmitting and/or receiving signals for transfer to and/or from the data terminal via the radiotelephone and a cellular network;

wherein said first step of transmitting signals is accomplished by means of a data bus of one of said first and said second coupling members with a central processor unit performing general control of the radiotelephone and a channel coder processor unit performing digital signal processing of the radiotelephone, and wherein the data transferred between the radiotelephone and the translator is processed digitally by the adapter in cooperation with the processor performing digital signal processing of the radiotelephone.

9. A method according to claim 8 wherein the first coupling member is responsive to signals from the radio telephone to interrupt data transmission.

10. A method according to claim 8 wherein the first coupling member is responsive to signals from the data terminal to interrupt data transmission.

11. A method for utilizing data services provided by a cellular network comprising:

coupling a radiotelephone and a data terminal using an adapter having a translator for translating signals conforming to a first protocol into signals conforming to a second protocol and vice versa, there being a first coupling member for detachably coupling the translator to the radiotelephone, and a second coupling member for detachably coupling the translator to the data terminal;

a first step of transmitting signals from one of the radiotelephone and the data terminal in one of the first and the second protocols;

translating the signals transmitted from the one of the first and the second protocols to the other of the first and the second protocols;

transmitting and/or receiving signals for transfer to and/or from the data terminal via the radiotelephone and a cellular network;

wherein said first step of transmitting signals is accomplished by means of a data bus of one of said first and said second coupling members with a central processor unit performing general control of the radiotelephone and a channel coder processor unit performing digital signal processing of the radiotelephone, and wherein the data transferred between the radiotelephone and the translator is processed digitally by the adapter in cooperation with the processor performing digital signal processing of the radiotelephone; and said data bus is a synchronous data bus, and said step of transmitting signals via the data bus is accomplished in response to clock signals provided by the radiotelephone.

12. A method according to claim 8 wherein said data bus is a serial data bus, and said method further comprises a step of employing the serial data bus for transferring, in addition to the data, the control messages and signaling messages included in a distributed implementation.

13. An adapter according to claim 1 wherein the data bus is a serial data bus, and wherein the radiotelephone is operative with clock signals, the data bus being adapted further to transmit data in response to the clock signals of the radiotelephone.

14. An adapter according to claim 1 wherein the data bus is a serial data bus, and wherein, in the data bus the transmission of both data and control messages is included in a distributed implementation.

15. A system for enabling a data terminal to use a desired data service offered by a wireless telecommunications network, comprising:

an adapter unit for bidirectionally coupling a radiotelephone to said data terminal, said adapter unit comprising a first input/output (I/O) interface for coupling to said data terminal and a second I/O interface for coupling to said radiotelephone, said adapter unit further comprising a first digital data processor that operates under the control of a program for processing digital data for executing service-specific protocols required to implement said desired data service;

said radiotelephone comprising an I/O interface coupled to a second digital data processor, that operates under the control of a program for processing digital data for controlling the operation of said radiotelephone and that implements signalling functions, and to a third digital data processor, that operates under the control of a program for processing digital data for executing high speed channel coding and decoding functions; and an active synchronous bus that is detachably coupled between said second I/O interface of said adapter and said I/O interface of said radiotelephone for coupling said first digital data processor selectively to a specified one of said second digital data processor or said third digital data processor, wherein a total amount of data processing that is required to use said desired data service is distributed amongst said first, second and third digital data processors, said digital data processing employing a message-based data communications technique for communicating data from said first digital data processor to a selected one of said second digital data processor or said third digital data processor, wherein an individual message comprises a destination address for the message.

16. A system as in claim 15, wherein said third digital data processor is comprised of a digital signal processor (DSP).

* * * * *